(12) United States Patent
Mondo (10) Patent No.: US 9,473,674 B2
(45) Date of Patent: Oct. 18, 2016

(54) DATA MIGRATION SYSTEM AND DATA MIGRATION METHOD

(71) Applicant: KYOCERA Document Solutions Inc., Osaka (JP)

(72) Inventor: Ryosuke Mondo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/582,702

(22) Filed: Dec. 24, 2014

(65) Prior Publication Data
US 2015/0189124 A1 Jul. 2, 2015

(30) Foreign Application Priority Data
Dec. 27, 2013 (JP) .................................. 2013-271848

(51) Int. Cl.
*H04N 1/44* (2006.01)
*H04N 1/00* (2006.01)
*H04L 29/06* (2006.01)

(52) U.S. Cl.
CPC ............ *H04N 1/4426* (2013.01); *H04L 63/08* (2013.01); *H04N 1/0097* (2013.01); *H04N 1/00342* (2013.01); *H04N 2201/0074* (2013.01); *H04N 2201/0094* (2013.01); *H04N 2201/3205* (2013.01)

(58) Field of Classification Search
CPC ... G07F 7/1008; G07F 7/084; G06Q 20/341; G06Q 20/355; G06Q 20/3563; G06Q 20/3552; G06Q 20/3576; G06K 7/0008; G06F 2009/4557; H04N 2201/0055; H04N 2201/0074; H04N 2201/0094; H04N 2201/3205; H04N 1/00342; H04N 1/00854; H04N 1/00875; H04N 1/4426; H04N 1/0097; H04L 63/08

USPC .................................................. 358/1.1, 1.14
See application file for complete search history.

(56) References Cited

U.S. PATENT DOCUMENTS

| 6,616,535 | B1 * | 9/2003 | Nishizaki | G07F 17/32 235/380 |
|---|---|---|---|---|
| 2006/0209359 | A1 * | 9/2006 | Kadowaki | H04N 1/00209 358/474 |
| 2009/0150176 | A1 * | 6/2009 | Gejdos | G06F 19/322 705/2 |
| 2012/0011580 | A1 * | 1/2012 | Eun | H04N 1/4406 726/10 |

(Continued)

FOREIGN PATENT DOCUMENTS

| JP | 2003-223424 A | 8/2003 |
|---|---|---|
| JP | 2005-219265 A | 8/2005 |

(Continued)

*Primary Examiner* — Iriana Cruz
(74) *Attorney, Agent, or Firm* — Studebaker & Brackett PC (57) ABSTRACT

A data migration system includes a migration source device and a migration target device that are capable of reading and writing data from and to an IC card. The migration source device includes a first storage section and a data write section. The first storage section stores user information. Upon detection of a waving of an IC card of a user, the data write section authenticates the user of the IC card and stores a user information piece about the authenticated user stored in the first storage section to the IC card. The migration target device includes a second storage section and a data receiving section. Upon detection of a waving of the IC card of the user, the data receiving section authenticates the user of the IC card and stores the user information piece stored in the IC card to the second storage section.

16 Claims, 8 Drawing Sheets

(56) References Cited

U.S. PATENT DOCUMENTS

2012/0099136 A1* 4/2012 Ueda .................. G06Q 20/346 358/1.14
2013/0250356 A1* 9/2013 Sasakura ............. G06F 3/1222 358/1.15

FOREIGN PATENT DOCUMENTS

| | | |
|---|---|---|
| JP | 2006-119902 A | 5/2006 |
| JP | 2006-239947 A | 9/2006 |

\* cited by examiner

DATA MIGRATION SYSTEM AND DATA MIGRATION METHOD

INCORPORATION BY REFERENCE

The present application claims priority under 35 U.S.C. §119 to Japanese Patent Application No. 2013-271848, filed Dec. 27, 2013. The contents of this application are incorporated herein by reference in their entirety.

BACKGROUND

The present disclosure relates to data migration systems and data migration methods. More specifically, it relates to data migration system and method in which migration is done through division of user information for individual users on a per user basis, thereby enabling provision of heightened security.

Various techniques have been proposed for data migration using an IC card.

For example, image forming apparatuses perform image formation on a recording medium based on image data. In an image forming apparatus with an interface, an IC card in which a maintenance program is written is attached to the interface, and the maintenance program is read from the IC card via the interface to cause the image forming apparatus to be in a maintenance state. This can prevent state transition to the maintenance state by a mis-operation. In addition, state transition to the maintenance state for a maintenance start can be done by a simplified manner in the image forming apparatus.

For example, an information terminal includes a controller for control at activation, a special menu controller, and a download controller. The information terminal transmits the inherent information of its own to an information center when powered. Then, the controller for control at activation causes the display device of the information terminal to display an initial menu screen. When an IC card is inserted, the information terminal transmits the inherent information of the IC card stored in the IC card to the information center. Then, the special menu controller causes the display device to display a special menu screen corresponding to the inherent information of the IC card. The download controller receives and stores data relating to the initial menu screen and the special menu screen that the information terminal receives from the information center. Thus, such a simple operation can enable utilization of the highly secured Internet In another example, a mobile electric device includes a communication section, an execution section, a receiving section, a storage section, and a setting section. The communication section communicates with a higher device. The execution section executes desired ordinary processing through communication with the higher device via the communication section. Each time the execution section executes ordinary processing, the receiving section receives a data piece of data pieces into which a single set of downloaded data transmitted from the higher device via the communication section is divided. The storage section stores the divided data pieces that the receiving section receives from the higher device in the order of receipt. The storage section is nonvolatile. When a data piece that the receiving section receives is the last divided data piece of the downloaded data, the setting section sets the data pieces stored in the storage section to be a single set of effective data. As a result, even a large amount of data can be downloaded efficiently, thereby increasing usability.

In still another example, an image forming apparatus is connected to a server via a network. The image forming apparatus includes a storage section, a backup controller, a deletion section, and a re-storage controller. The storage section stores at least information of which security is required to be ensured (information of which security is ensured) out of information concerning the image forming apparatus. The backup controller backs up the information of which security is ensured from the storage section to the server via the network when the image forming apparatus is in a first state. In response to success of the backup of the information of which security is ensured, the deletion section deletes the information of which security is ensured from the storage section. The re-storage controller downloads the information of which security is ensured from the server via the network and re-stores it to the storage section when the image forming apparatus is in a second state. In this manner, migration of at least the information of which security is required to be ensured to the server can favorably prevent information leakage and the like. Further, even when information retained in the server becomes necessary again, transmission of the information from the server to the image forming apparatus can make the information useable again.

SUMMARY

According to the first aspect of the present disclosure, a data migration system includes a migration source device and a migration target device that are capable of reading and writing data from and to an IC card. The migration source device includes a first storage section and a data write section. The first storage section is configured to store user information. Upon detection of a waving of an IC card of a user, the data write section authenticates the user of the IC card and stores a user information piece about the authenticated user in the first storage section to the IC card. The migration target device includes a second storage section and a data receiving section. Upon detection of a waving of the IC card of the user, the data receiving section authenticates the user of the IC card and stores the user information piece stored in the IC card to the second storage section.

According to the second aspect of the present disclosure, a data migration method is a data migration method for a data migration system including a migration target device and a migration source device that are capable of reading and writing data from and to an IC card. The migration source device includes a first storage section. The migration target device includes a second storage section. The method includes: causing the migration source device to authenticate a user of an IC card upon detection of a waving of the IC card of the user, and to store a user information piece about the authenticated user in the first storage section to the IC card; and causing the migration target device to authenticate the user of the IC card upon detection of a waving of the IC card of the user, and to store the user information piece stored in the IC card to the second storage section.

DETAILED DESCRIPTION

With reference to the accompanying drawings, embodiments of a data migration system according to the present disclosure will be described for understanding the present disclosure. Noted that the same reference numerals are assigned to the same or corresponding elements in the drawings, and the description thereof will not be repeated. It is also noted that the following embodiments are mere specific examples of the present disclosure and should not be taken to limit the technical scope of the present disclosure.
<Data Migration System>

Figure 1:
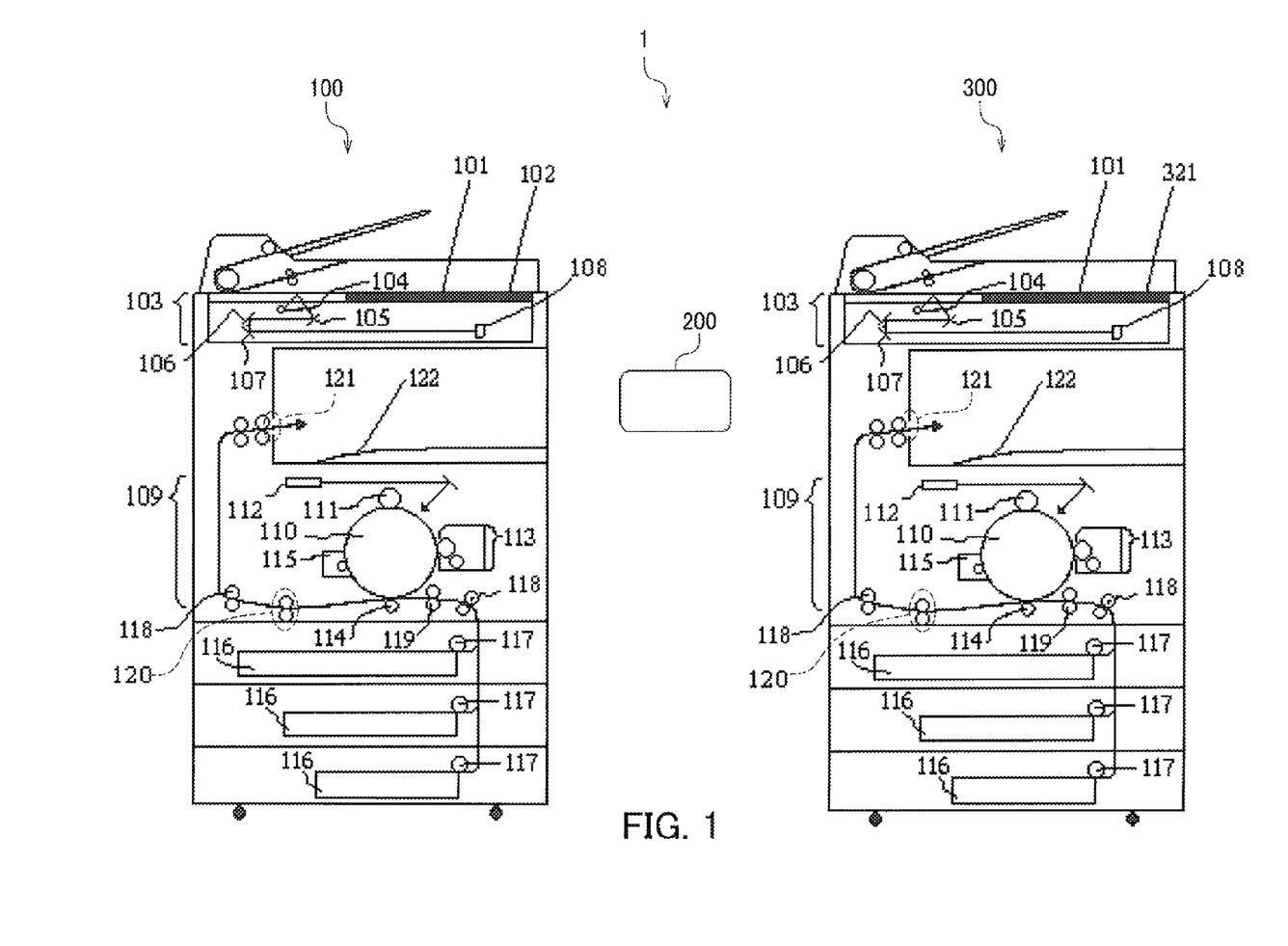
FIG. 1 is a schematic illustration showing the configuration of a data migration system according to an embodiment of the present disclosure.

With reference to FIG. 1, description will be made below of a data migration system 1 according to an embodiment of the present disclosure. FIG. 1 is a schematic illustration showing the configuration of the data migration system 1 according to the embodiment of the present disclosure. The data migration system 1 includes a migration source device 100 as a data migration source and a migration target device 300 as a data migration target. The migration source device 100 and the migration target device 300 are each capable of reading and writing data to and from IC card 200s. Note that elements not directly relating to the present disclosure are not specifically shown.

The migration source device 100 and the migration target device 300 of the data migration system 1 each are, for example, an image forming apparatus having at least one function of a copier, a scanner, a printer, etc. In the present embodiment, the migration source device 100 and the migration target device 300 are multifunction peripherals (MFPs). Each multifunction peripheral is an image forming apparatus having at least two of a copy function, a scan function, a printing function, etc. Hereinafter, the migration source device 100 and the migration target device 300 are referred to as a migration source MFP 100 and a migration target MFP 300, respectively.

Brief description will be made below of operation of the migration source MFP 100 when a user uses the copy function, for example. The migration source MFP 100 includes a document table 101, an operation section 102, an image reading section 103, a light source 104, mirrors 105, 106, and 107, an image sensor 108, an image forming section 109, paper feed cassettes 116, pickup rollers 117, conveyance rollers 118, registration rollers 119, a fixing device 120, an exit port 121, and an in-body tray 122.

First, in order to use the migration source MFP 100, a user places an original document on the document table 101 provided on the top of the box body of the migration source MFP 100. The user operates the operation section 102 (an operation panel) provided in the vicinity of the operation section 102 to input a setting condition relating to image processing through the operation screen of the operation section 102. When the user press down a start key provide on the operation section 102, the migration source MFP 100 starts image processing (copying and printing).

Next, the light emitted from the light source 104 in the image reading section 103 is reflected on the original document placed on the document table 101. The mirrors 105, 106, and 107 guide the reflected light to the image sensor 108. The image sensor 108 photoelectrically converts the guided light to generate image data corresponding to the original document.

The image forming section 109 corresponds to a portion of the migration source MFP 100 in which a toner image (a visible image) is formed based on image data. The image forming section 109 includes a photosensitive drum 110, a charger 111, an exposure unit 112, a developing device 113, a transfer unit 114, and a cleaning unit 115. The photosensitive drum 110 rotates in a predetermined direction at a constant speed. The charger 111, the exposure unit 112, the developing device 113, the transfer unit 114, the cleaning unit 115, etc. are arranged around the photosensitive drum 110 sequentially in the direction of rotation.

The charger 111 uniformly charges the surface of the photosensitive drum 110. The exposure unit 112 irradiates the charged surface of the photosensitive drum 110 with a laser based on image data to form an electrostatic latent image. The developing device 113 causes toner to adhere to the formed electrostatic latent image, thereby forming a toner image. The transfer unit 114 transfers the formed toner image to a recording medium (e.g., paper or an overhead projector film). The cleaning unit 115 removes surplus toner remaining on the surface of the photosensitive drum 110. The above series of processes is executed in the course of rotation of the photosensitive drum 110.

A sheet is conveyed from any one of the paper feed cassettes 116 provided in the migration source MFP 100. The sheet is pulled out into a conveyance path from the paper feed cassette 116 by the corresponding pickup roller 117. The paper feed cassettes 116 accommodate sheets having different properties. Any of the sheets is selected according to a setting condition relating to image processing and is pulled out to the conveyance path. In other words, the sheet is fed. Each paper feed cassette 116 may accommodate sheets having the same property. The migration source MFP 100 may alternatively include only one paper feed cassette 116.

The sheet pulled out to the conveyance path is sent between the photosensitive drum 110 and the transfer unit 114 by the conveyance rollers 118 and the registration rollers 119. The toner image is transferred to the sheet between the photosensitive drum 110 and the transfer unit 114 by the transfer unit 114. The sheet to which the toner image has been transferred is conveyed to the fixing device 120.

During the time when the sheet to which the toner image has been transferred passes between a heating roller and a pressure roller of the fixing device 120, heat and pressure are applied to the toner image, thereby fixing the toner image to the sheet. The heat quantity of the heating roller is set optimally according to the property of the sheet, thereby achieving appropriate fixing of the toner image to the sheet. Once the toner image is fixed to the sheet, in other words, once image formation is completed, the sheet is ejected to the in-body tray 122 formed inside the box body through the exit port 121 by the conveyance rollers 118. The ejected sheet is stacked and accommodated on the in-body tray 122. Through the above series of processes, the migration source MFP 100 provides the copy function to the user.

The migration source MFP 100 of the data migration system 1 in the present disclosure is an image forming apparatus serving as a data migration source. The migration target MFP 300 is an image forming apparatus serving as a data migration target and has the same function as the migration source MFP 100. In data migration from the migration source MFP 100 to the migration target MFP 300, user's waving of an IC card 200 over the card readers of the migration source MFP 100 and the migration target MFP 300 can cause migration of a user information piece about the user. The data migration method will be described later in detail.

Figure 2:
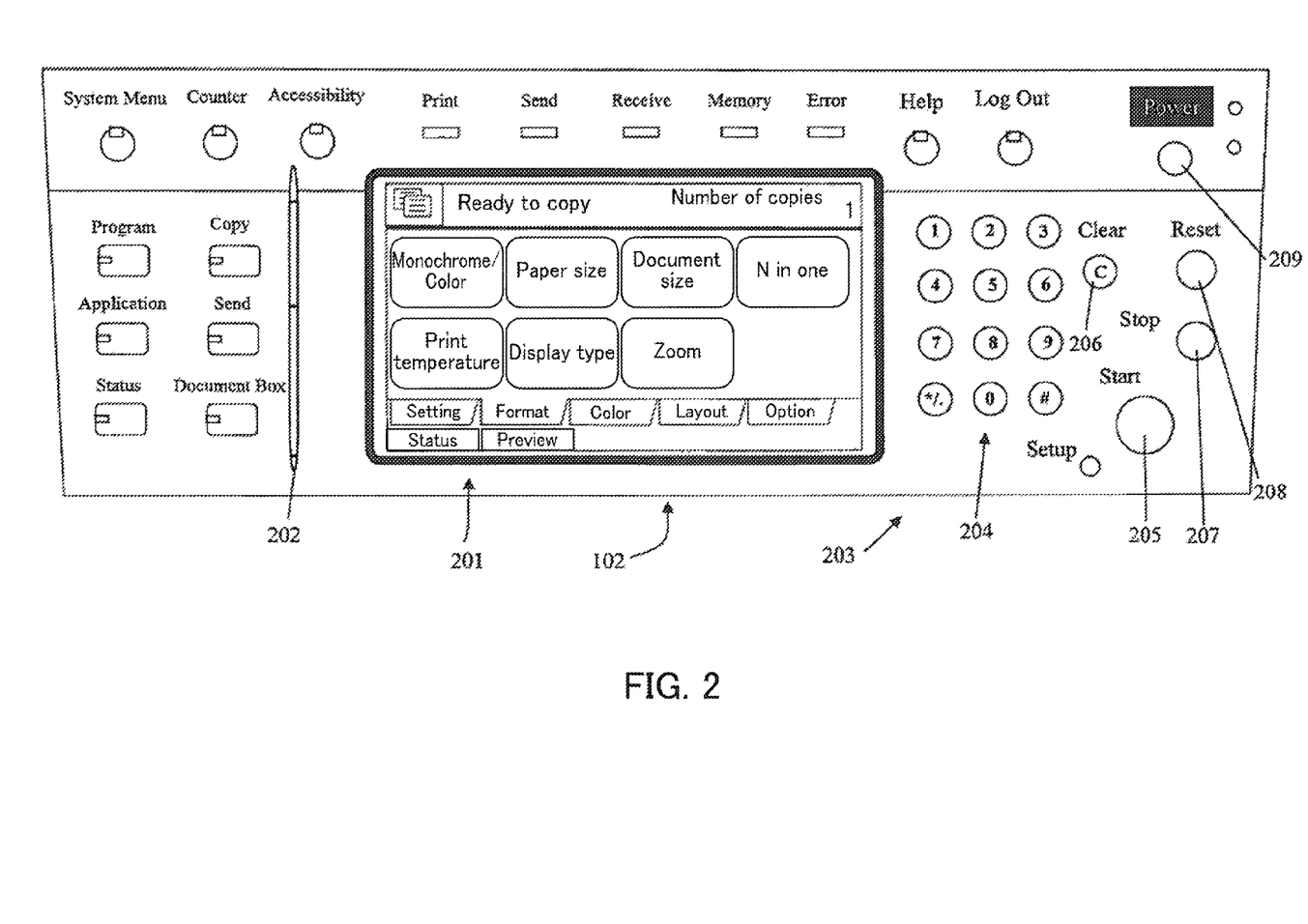
FIG. 2 is an illustration showing the overall configuration of an operation section of a migration source MFP according to an embodiment of the present disclosure.

FIG. 2 is a conceptual diagram showing the overall configuration of the operation section 102 of the migration source MFP 100 according to an embodiment of the present disclosure. A user inputs a setting condition relating the aforementioned image processing through the operation section 102. Alternatively, the user confirms the setting condition input through the operation section 102. In order to input a setting condition through the operation section 102, a user uses a touch panel 201 (an operation panel), a stylus 202, or operation keys 203 provided on the operation section 102.

The touch panel 201 has functions of inputting a setting condition (e.g., keys) and displaying a setting condition. That is, when a user presses down any key in a screen displayed on the touch panel 201, the setting condition corresponding to the pressed key is input.

A display section such as a liquid crystal display or the like (not shown) is provided on the back of the touch panel 201. The display section displays an operation screen such as an initial screen, for example. The stylus 202 is provided in the vicinity of the touch panel 201. When a user makes the tip end of the stylus 202 to come into contact with the touch panel 201, a sensor provided in the touch panel 201 detects the contact of the stylus 202.

A predetermined number of operation keys 203 are provided further in the vicinity of the touch panel 201. The operation keys 203 include a numeric keypad 204, the start key 205, a clear key 206, a stop key 207, a reset key 208, and a power key 209, for example.

Figure 3:
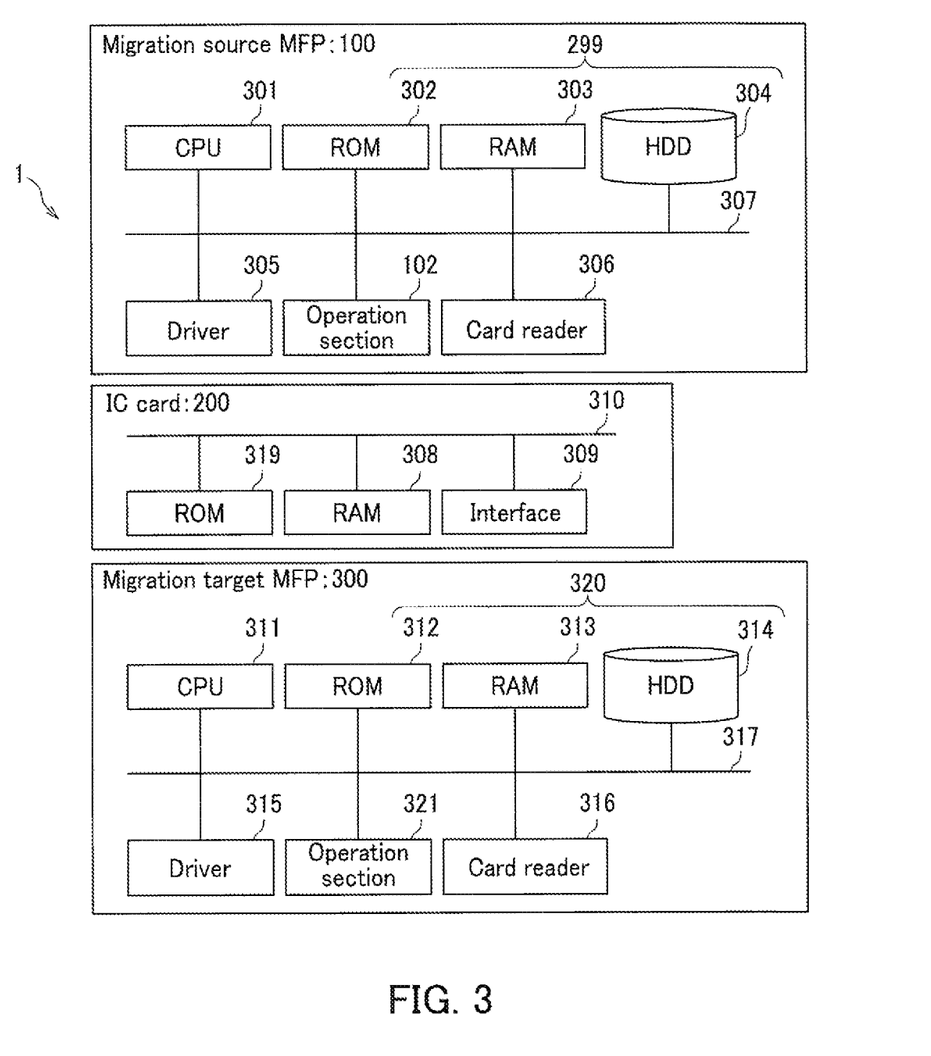
FIG. 3 is a schematic illustration showing the configuration of control hardware of the data migration system according to the embodiment of the present disclosure.

The configuration of control hardware of the data migration system 1 will be described next with reference to FIG. 3. FIG. 3 is a schematic illustration showing the configuration of the control hardware of the data migration system 1 according to the present disclosure. Note that elements not directly relating to the present disclosure are not specifically shown.

The migration source MFP 100 of the data migration system 1 includes a first storage section 299, a central processing unit (CPU) 301, a driver 305, an operation section 102, a card reader 306 (interface), and an internal bus 307. The first storage section 299 includes a read only memory (ROM) 302, a random access memory (RAM) 303, and a hard disk drive (HDD) 304. The first storage section 299 stores user information. The CPU 301, the ROM 302, the RAM 303, the HDD 304, the driver 305 corresponding to respective drive sections, the operation section 102, and the card reader 306 are connected together through the internal bus 307 to form a control circuit of the migration source MFP 100. The card reader 306 detects a waving of an IC card 200.

The CPU 301 executes programs stored in the ROM 302, the HDD 304, or the like using the RAM 303 as a work area. The CPU 301 transmits and receives data, instructions, signals, commands, or the like to and from the driver 305, the operation section 102, or an IC card 200 waved over the card reader 306 to control the operations of the respective drive sections shown in FIG. 1 based on the execution result of the programs.

A ROM 319, a RAM 308, and an interface 309 included in each IC card 200 of the data migration system 1 are connected together via an internal bus 310 to form a control circuit. The IC card 200 stores data of the migration source MFP 100. When the interface 309 of an IC card 200 faces the card reader 306 of the migration source MFP 100, the migration source MFP 100 is enabled to read out data from the IC card 200 and write data into the IC card 200.

The migration target MFP 300 of the data migration system 1 includes a second storage section 320, a CPU 311, a driver 315, an operation section 321, and a card reader 316 (interface). The second storage section 320 includes a ROM 312, a RAM 313, and a HDD 314. The control circuit of the migration target MFP 300 is the same as that of the migration source MFP 100. That is, the CPU 311, the ROM 312, the RAM 313, the HDD 314, the driver 315 corresponding to the respective drive sections, the operation section 321, and the card reader 316 are connected together via the internal bus 317 to form a control circuit. The respective functions of the second storage section 320, the CPU 311, the driver 315, the operation section 321, and the card reader 316 that the migration target MFP 300 includes are the same as those of the first storage section 299, the CPU 301, the driver 305, the operation section 321, and the card reader 306 that the migration source MFP 100 includes, respectively.

Figure 4:
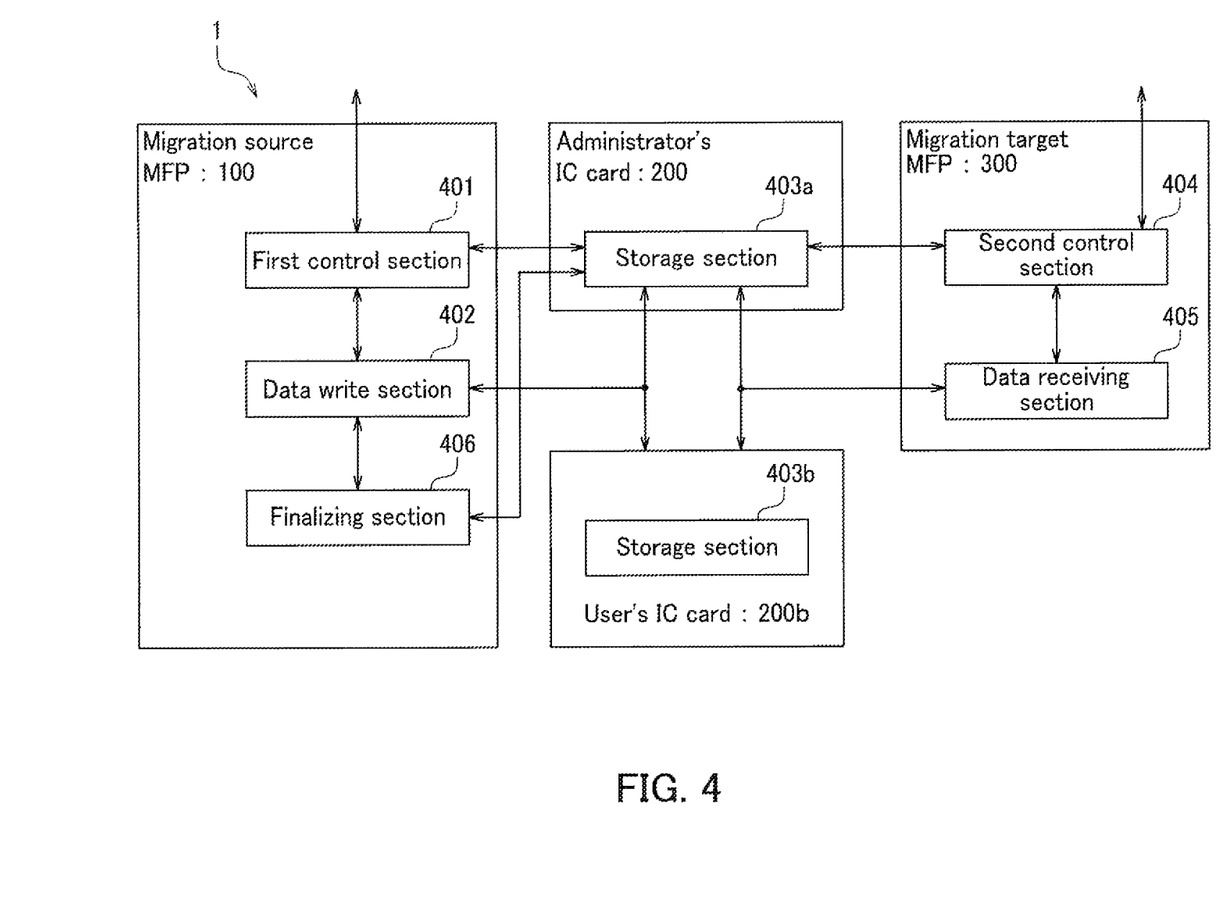
FIG. 4 is a functional block diagram of the data migration system according to the embodiment of the present disclosure.

Elements shown in FIG. 4 other than the drive sections are realized through execution of corresponding programs by the CPU 301 of the migration source MFP 100 or the CPU 311 of the migration target MFP 300. The respective elements other than the drive sections will be described later in detail with reference to FIG. 4. Programs and/or data for realizing the respective sections described below are correspondingly stored in the ROM 302, the RAM 303, and/or the HDD 304 of the migration source MFP 100, the ROM 319 and/or the RAM 308 of the IC card 200, and the ROM 312, the RAM 313 and/or the HDD 314 of the migration target MFP 300.

<Embodiments of the Present Disclosure>

With reference to FIGS. 3-6E, the configuration and execution procedure of the data migration according to the embodiment of the present disclosure will be described next. FIG. 4 is a functional block diagram of the data migration system 1 according to the present disclosure. The migration source MFP 100 includes a first control section 401, a data write section 402, and a finalizing section 406. Upon detection of a waving of an IC card 200b, the data write section 402 authenticates the user of the IC card 200b and stores to the IC card 200b a user information piece about the authenticated user stored in the first storage section 299. An IC card 200a includes a storage section 403a. The IC card 200b includes a storage section 403b. The migration target MFP 300 includes a second control section 404 and a data receiving section 405. Upon detection of a waving of the IC card 200b, the data receiving section 405 authenticates the user of the IC card 200b and stores the user information piece stored in the IC card 200b to the second storage section 320.

Figure 5A:
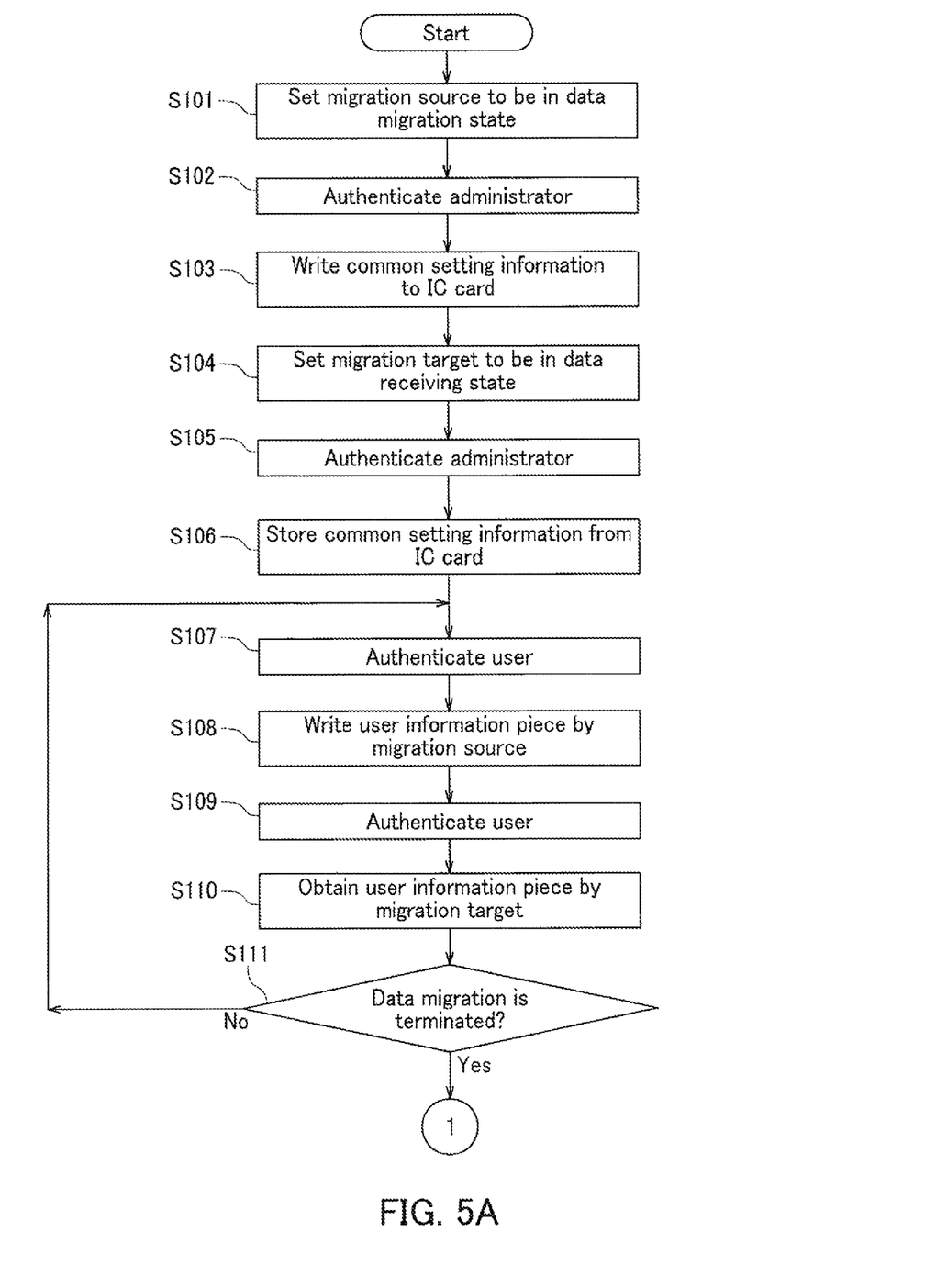
FIG. 5A is a flowchart depicting the first half of a data migration method according to an embodiment of the present disclosure.
Figure 5B:
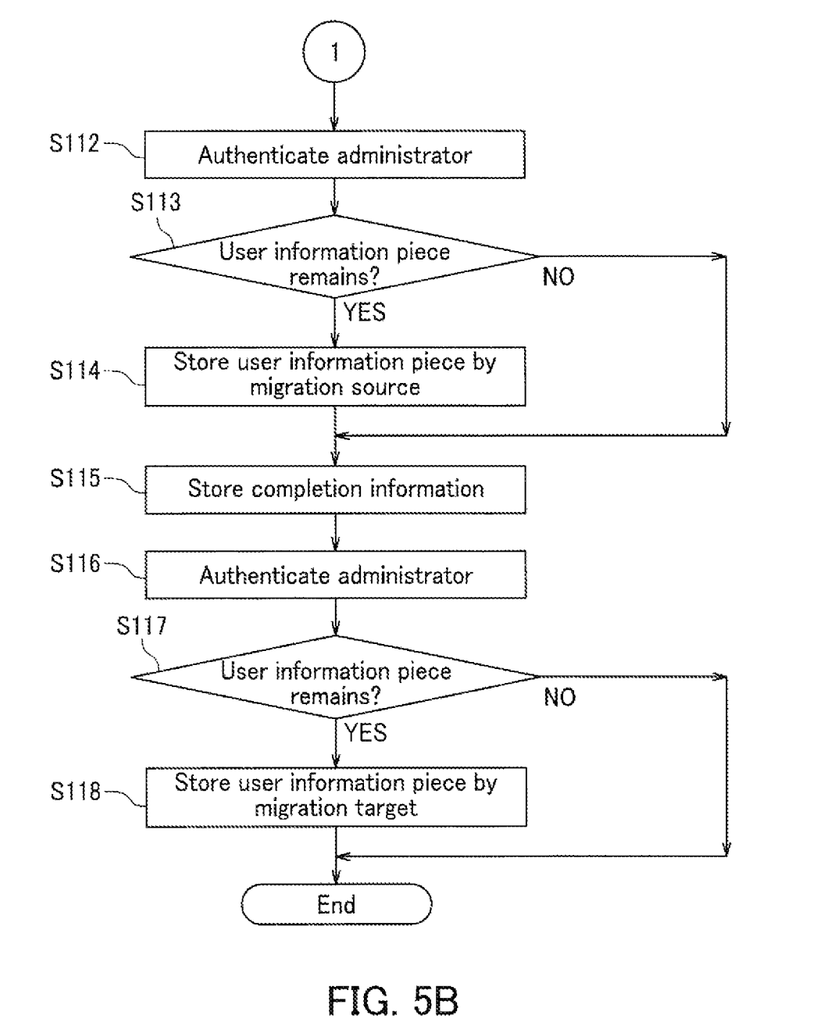
FIG. 5B is a flowchart depicting the second half of the data migration method according to the embodiment of the present disclosure.
Figure 6A:
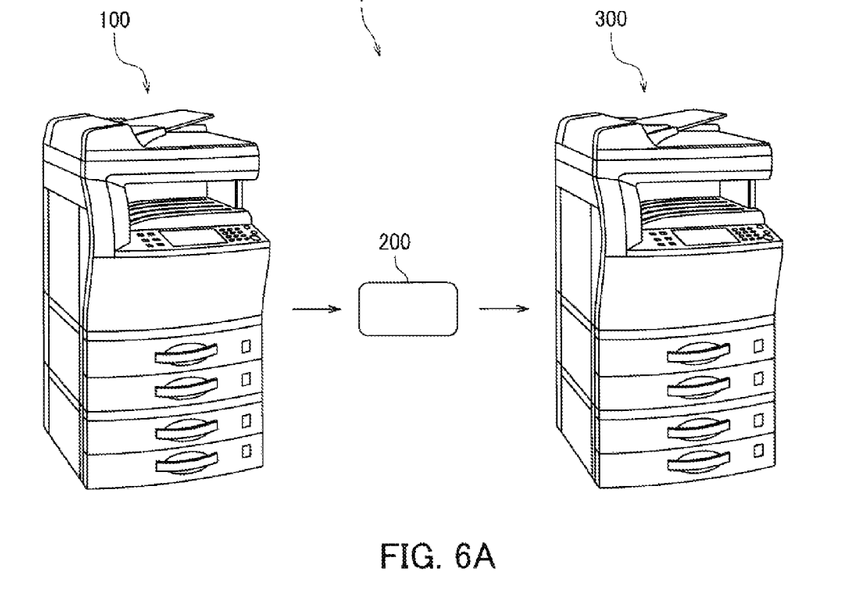
FIG. 6A is a conceptual diagram showing data migration in the data migration system according to an embodiment of the present disclosure.
Figure 6B:
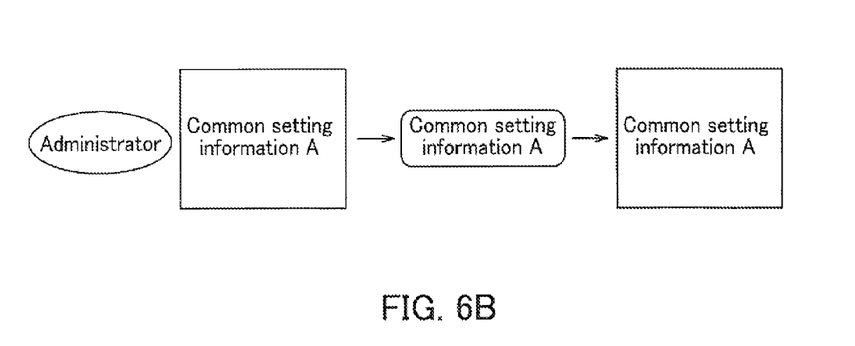
FIG. 6B is a conceptual diagram showing data migration that an administrator executes in the data migration system according to the embodiment of the present disclosure.
Figure 6C:
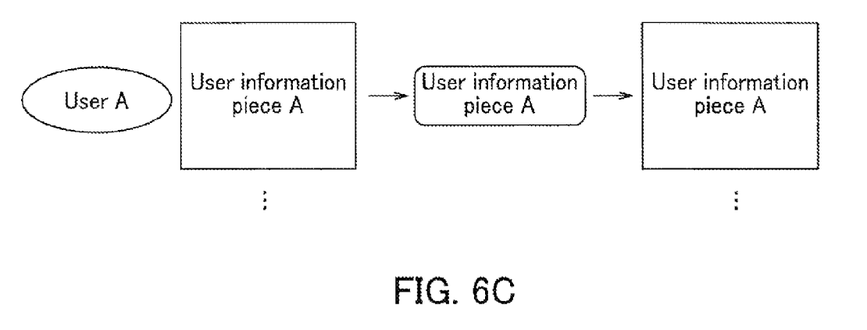
FIG. 6C is a conceptual diagram showing data migration that a registered user executes in the data migration system according to the embodiment of the present disclosure.
Figure 6D:
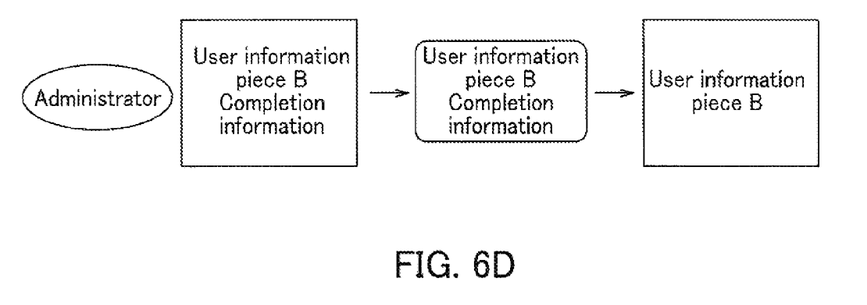
FIG. 6D is a conceptual diagram showing termination of data migration that an administrator executes when a user information piece remains in the migration source MFP in the data migration system according to the embodiment of the present disclosure.
Figure 6E:
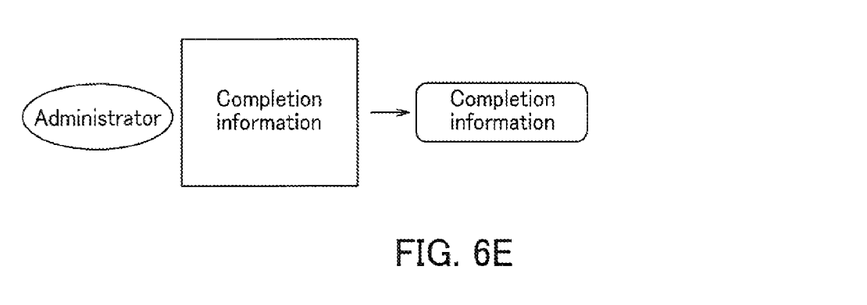
FIG. 6E is a conceptual diagram showing termination of data migration that an administrator executes when no user information piece remains in the migration source MFP in the data migration system according to the embodiment of the present disclosure.

FIGS. 5A and 5B are flowcharts depicting the data migration method according to the present disclosure. FIG. 6A is a conceptual diagram showing the data migration in the data migration system 1. FIG. 6B is a conceptual diagram showing data migration that an administrator executed in the data migration system 1. FIG. 6C is a conceptual diagram showing data migration that a user A executes in the data migration system 1. FIG. 6D is a conceptual diagram showing termination of data migration that the administrator executes where a user information piece remains in the migration source MFP 100 in the data migration system 1. FIG. 6E is a conceptual diagram showing termination of data migration that the administrator executes where no user information piece remains in the migration source MFP 100 in the data migration system 1.

As shown in FIGS. 6A and 6B, a given user (e.g., an administrator) first goes to the migration source MFP 100 (e.g., a multifunction peripheral A) and activates the migration source MFP 100. In response to activation of the migration source MFP 100, the first control section 401 of the migration source MFP 100 is activated to cause the touch panel 201 to display a predetermined operation screen.

For migration of data in the migration source MFP 100 to the migration target MFP 300 (e.g., multifunction peripheral B), the administrator watches the operation screen and selects a data migration start key on a system menu screen or the like. In response to selection of the data migration start key, the first control section 401 notifies the data write section 402 of the selection. The notified data write section 402 is changed from a standby state to a data migration state (S101 in FIG. 5A). During the time when the data write section 402 is in the standby state, the migration source MFP 100 is capable of performing image formation on a sheet.

The data write section 402 in the data migration state activates the card reader 306, for example. The activated card reader 306 causes the touch panel 201 to display a screen inviting a waving of the administrator's IC card 200a and receives a waving of the administrator's IC card 200a by the administrator.

In the present embodiment, the IC cards 200 (200a and 200b) each include an integrated circuit and are delivered on a per user basis. Each IC card 200 can be used for user authentication (identification) and has a memory function of storing data up to a predetermined amount, for example, several tens kilobytes. Accordingly, each IC card 200 has an enough capacity to store common setting information, which will be described later, and a user information piece of which data amounts are less. Where both the migration source MFP 100 and the migration target MFP 300 are installed in a given office, the IC cards 200 may serve as employee ID cards of the office. The IC cards 200 may be possessed by a plurality of users in common.

The administrator waves the administrator's IC card 200a over the card reader 306 of the migration source MFP 100, while watching the screen displayed on the touch panel 201. When the card reader 306 detects the waving of the administrator's IC card 200a, specifically, when the interface 309 of the administrator's IC card 200a faces the card reader 306, the data write section 402 authenticates the user of the IC card 200a as an administrator (S102 in FIG. 5).

Any authentication method is employable herein for determining whether or not the user of the IC card 200a is an administrator. For example, the data write section 402 obtains information for user identification (e.g., "ZZZ") registered in advance in the IC card 200a and compares the obtained information for user identification with information for identification of each registered administrator stored in advance in the first storage section 299 of the migration source MFP 100. The registered administrator herein means a user registered as a user authorized to administrate the migration source MFP 100. The comparison result indicates a match between the information for user identification registered in advance in the IC card 200a and the information for identification of each registered administrator, the data write section 402 authenticates the user of the IC card 200a as an administrator.

By contrast, the comparison result indicates a mismatch between the information for user identification in the waved IC card and the information for identification of each registered administrator, the data write section 402 causes the touch panel 201 to display a screen indicating that the user of the IC card is not an administrator, for example. The card reader 306 then awaits again a waving of the proper administrator's IC card 200a.

Once the user of the IC card 200a is authenticated as an administrator, the data write section 402 obtains common setting information (e.g., common setting information A) stored in the first storage section 299 of the migration source MFP 100. The data write section 402 writes (stores) the obtained common setting information (common setting information A) into the storage section 403a (e.g. the RAM 308) of the IC card 200a (S103 in FIG. 5A).

The common setting information herein means setting information for migration source MFP 100 common to every user other than the user information, that is, information other than the inherent information of each user. Examples of the common setting information may include program information for common setting, favorite information, default screen information, default cassette setting information, etc.

This can enable migration of the common setting information by the administrator from the migration source MFP 100 to the migration target MFP 300 through the administrator's come-and-go.

Upon completion of writing of the common setting information (common setting information A) to the IC card 200a, the data write section 402 causes the touch panel 201 to display a screen inviting a waving of an IC card 200b of a registered user who is permitted to use the migration source MFP 100 other than the administrator, for example. Then, the card reader 306 awaits a waving of the IC card 200b by a user.

In this situation, the administrator may input information that can specify the migration target MFP 300 (e.g., information that can identify the multifunction peripheral B) so as to make the data write section 402 causing the touch panel 201 of the migration source MFP 100 to display a screen leading a user to the migration target MFP 300 based on the input information that can specify the migration target MFP 300.

Subsequently, the administrator goes to the migration target MFP 300 (multifunction peripheral B) for activation. Activation of the migration target MFP 300 activates the second control section 404 of the migration target MFP 300 to cause the touch panel 201 to display a predetermined operation screen.

In order to set the migration target MFP 300 to be capable of receiving data, the administrator watches the operation screen and selects a data migration receiving key on the system menu screen or the like. In response to selection of the data migration receive key, the second control section 404 notifies the data receiving section 405 of the receipt. The notified data receiving section 405 is changed from the standby state to a data receiving state (S104 in FIG. 5A). During the time when the data receiving section 405 is in the standby state, the migration target MFP 300 is capable of performing image formation on a sheet.

Once the data receiving section 405 is set to be in the data receiving state, for example, the card reader 316 is activated. The card reader 316 causes the touch panel 201 of the migration target device 300 to display a screen inviting a waving of the administrator's IC card 200*a* and receives a waving of the administrator's IC card 200*a* by the administrator.

The administrator watches the screen displayed on the touch panel 201 and waves the administrator's IC card 200*a* over the card reader 316 of the migration target MFP 300. When the card reader 316 detects the waving of the administrator's IC card 200*a*, in other words, when the interface 309 of the administrator's IC card 200*a* faces the card reader 316, the data receiving section 405 authenticates the user of the IC card 200*a* as an administrator (S105 in FIG. 5A).

The data receiving section 405 obtains the common setting information (common setting information A) written in the storage section 403*a* of the IC card 200*a* and replaces the common setting information (e.g., common setting information B) for the migration target MFP 300 by the obtained common setting information (common setting information A) (S106 in FIG. 5A). That is, the data receiving section 405 stores the obtained common setting information (common setting information A) to the second storage section 320 that stores the common setting information (e.g., common setting information B) for the migration target MFP 300. Thus, migration of the common setting information using the administrator's IC card 200*a* is completed. Note that the authentication method by which the data receiving section 405 authenticates a user of the IC card 200*a* as an administrator is the same as the authentication method that the data write section 402 of the migration source MFP 100 executes, and every registered administrator is registered in advance in the ROM 312 or the HDD 314 of the migration target MFP 300.

Once the data receiving section 405 completes receipt (storage) of the common setting information (common setting information A) stored in the storage section 403*a* of the IC card 200*a*, for example, the data receiving section 405 deletes the common setting information (common setting information A) stored in the storage section 403*a* of the administrator's IC card 200*a*. The data receiving section 405 causes the touch panel 201 to display a screen inviting a waving of the user's IC card 200*b*. Then, the card reader 316 awaits a waving of the user's IC card 200*b*. Thus, both the migration source MFP 100 and the migration target MFP 300 are ready for data migration.

As shown in FIGS. 6A and 6C, a given user (e.g., a user A) waves his/her IC card 200*b* over the card reader 306 of the migration source MFP 100 in order to utilize the migration source MFP 100. When the card reader 306 detects the waving of the user A's IC card 200*b*, that is, when the interface 309 of the user A's IC card 200*b* faces the card reader 306, the user A is authenticated as a registered user (S107 in FIG. 5A).

Any method is employable as the authentication method by which the data write section 402 authenticates the user A of the IC card 200*b* as a registered user as far as that can determine whether or not the user is a registered user, similarly to the aforementioned method. For example, the data write section 402 obtains information for identification of the user A (e.g., "AAA") registered in advance in the IC card 200*b* and compares the obtained information for identification of the user A with the information for identification of each registered administrator stored in advance in the first storage section 299 of the migration source MFP 100. The registered user herein means a user registered as a user authorized to use the migration source MFP 100. When the comparison result indicates a match between the information for identification of the user stored in advance in the IC card 200*b* and the information for identification of each registered user, the data write section 402 authenticates the user of the IC card 200*b* as a registered user.

By contrast, the comparison result indicates a mismatch between the information for identification of the user of the waved IC card and the information for identification of each registered user, for example, the data write section 402 causes the touch panel 201 to display a screen indicating that the user of the IC card is not a registered user. Then, the data write section 402 awaits again a waving of the IC card 200*b* by a proper registered user.

Upon authentication of the user A who possesses the IC card 200*b* as a registered user, the data write section 402 obtains a user information piece (e.g., user information piece A) about the authenticated user that is stored in the first storage section 299 of the migration source MFP 100 from the first storage section 299 of the migration source MFP 100. The data write section 402 writes the obtained user information piece A into the storage section 403*b* of the IC card 200*b*.

The user information piece herein is personal information inherent to a corresponding user and registered on a per user basis. Examples of the user information may include address information, administration information, document box information, fax number, etc. that are inherent to respective users. With the user information piece A, the user A who possesses the IC card 200*b* can transmit only the user information piece A from the migration source MFP 100 to the IC card 200*b*.

Once the data write section 402 completes writing of the user information piece A to the IC card 200*b*, the user information piece A about the user A stored in the first storage section 299 of the migration source MFP 100 is deleted. For example, where the user information piece A is stored in the HDD 304, the data write section 402 deletes the user information piece A from the HDD 304 after storage of the user information piece A stored in the HDD 304 to the IC card 200*b*. Thus, a waving of the user A's IC card 200*b* can delete the user information piece A from the user information stored in the migration source MFP 100. In other words, each time an IC card containing identification information corresponding to a user information piece is waved over the migration source MFP 100, the stored user information is deleted piece by piece.

After deletion of the user information piece A, the data write section 402 causes the touch panel 201 to display a screen indicating that the migration source MFP 100 is currently performing data migration and inviting the user to utilize the migration target MFP 300 instead of the migration source MFP 100. The user A watching the screen displayed on the touch panel 201 is invited to utilize the migration target MFP 300.

Then, the user A goes to the migration target MFP 300 (multifunction peripheral B) and waves his/her IC card 200*b* over the card reader 316 of the migration target MFP 300. When the card reader 316 detects the waving of the IC card 200*b*, that is, when the interface 309 of the user As' IC card 200*b* faces the card reader 316, the data receiving section 405 authenticates the user A as a registered user (S109 in FIG. 5A). The card reader 316 reads the user information piece A about the user A stored in the storage section 403*b* of the IC card 200*b* and stores the user information piece A to the second storage section 320 of the migration target MFP 300 that stores the user information (S110 in FIG. 5A). Note that the registered user authenticating method executed in the migration target MFP 300 is the same as that executed in the migration source MFP 100, and every registered user is registered in advance in the migration target MFP 300.

Thus, user's come-and-go for using the migration source MFP 100 can be utilized for migration of only the user information piece about the user from the migration source MFP 100 to the migration target MFP 300. In other words, the user information is divided into pieces on a per user basis, and the respective users are made to perform migration of the divided user information pieces about them. Accordingly, the administrator needs not carry out migration of the user information in batch. This can enable migration of the user information even in the case using an image forming apparatus that is disabled to use an external storage medium (e.g., a USB memory) or an image forming apparatus the use of any external storage medium for which is prohibited in accordance with the office policy or the like.

Once the data receiving section 405 completes storage of the user information piece A stored in the user A's IC card 200*b*, the user information piece A about the user A stored in the storage section 403*b* of the IC card 200*b* is deleted. Thus, migration of the user information piece A about the user A is completed.

In addition, once migration of the user information piece A about the user A is completed, the data receiving section 405 may cause the touch panel 201 of the migration target MFP 300 to display a screen indicating that the migration target MFP 300 is currently in a data receiving state. Further, the data receiving section 405 notifies the second control section 404 of the user A being a registered user. In response to the notification, the second control section 404 may cause the touch panel 201 to display a predetermined operation screen during authentication of the user A (during log in) and receives a given condition setting for image formation from the user A for provision of the copy function or the like.

The aforementioned series of processes S107-S110 is repeated on a per user basis until an administrator inputs an instruction to terminate data migration (No at S111 in FIG. 5A). In this situation, for example, the administrator may call each registered user of the migration source MFP 100 and the migration target MFP 300 via a mail or any other given notification scheme to urge migration of user information pieces on a per user basis. Examples of administrator's notification to each registered user may include invitation to migration of their user information piece using their IC cards.

Through repetition of the processes at S107-S110, a plurality of users transmit their user information pieces from the migration source MFP 100 to the migration target MFP 300 using their IC cards. The user information stored in the migration source MFP 100 is deleted piece by piece each time a user transmits his/her user information piece to the migration target MFP 300. By contrast, the user information pieces stored in the migration target MFP 300 are accumulated each time a user transmits his/her user information piece to the migration target MFP 300.

After a while, that is, after every user has transmitted his/her user information piece from the migration source MFP 100 to the migration target MFP 300, the administrator goes to the migration source MFP 100 and carries out a predetermined operation. In response thereto, the data write section 402 causes the touch panel 201 to display a screen asking whether or not data migration by the user is terminated.

If the term for data migration by a user is desired to extend, for example, the administrator presses down a cancel key for not terminating the data migration. When the data write section 402 receives input of the cancel key (No at S111 in FIG. 5A), the routine returns to S107, so that the migration source MFP 100 awaits again a waving of an IC card 200*b* by a user that has not yet carried out data migration.

By contrast, for example, when termination of data migration by a user is desired, the administrator presses down a finish key for termination of the data migration. Once the data write section 402 receives input of the finish key (Yes at S111 in FIG. 5A), the routine proceeds to S112 in FIG. 5B, so that the migration source MFP 100 awaits a waving of the administrator's IC card 200*a*.

When the administrator waves his/her IC card 200*a* over the card reader 306 of the migration source MFP 100, the data write section 402 detects the waving of the administrator's IC card 200*a*. The data write section 402 authenticates the user of the IC card 200*a* as an administrator (S112 in FIG. 5B) and notifies the finalizing section 406 of the authentication. The notified finalizing section 406 determines whether or not any user information piece still remains in the first storage section 299 of the migration source MFP 100 (S113 in FIG. 5B).

As shown in FIG. 6D, when the determination result indicates that an information piece (e.g., a user information piece B) still remains in the first storage section 299 of the migration source MFP 100 (Yes at S113 in FIG. 5B), the finalizing section 406 obtains every user information piece (the user information piece B) remaining in the migration source MFP 100 from the first storage section 299 and writes (stores) the obtained user information piece (the user information piece B) to the storage section 403*a* of the IC card 200*a* (S114 in FIG. 5B). Thus, even if some user (e.g., user B) forgets his/her routine of data migration, the administrator can transmit the user information piece about the user B from the migration source MFP 100 to the migration target MFP 300.

Once the finalizing section 406 stores every user information piece (the user information piece B) remaining in the first storage section 299 of the migration source MFP 100 to the administrator's IC card 200*a*, the common setting information and all user information pieces stored in the migration source MFP 100 are deleted from the first storage section 299. Further, the finalizing section 406 stores completion information indicative of completion of data migration in the migration source MFP 100 to the storage section 403*a* of the administrator's IC card 200*a* (S115 in FIG. 5B). Thus, data migration in the migration source MFP 100 is completed. Therefore, the migration source MFP 100 is unnecessary in later data migration.

Note that, as shown in FIG. 6E, the determination result at S113 indicates that no user information piece remains in the first storage section 299 of the migration source MFP 100 (No at S311 in FIG. 5B), the routine proceeds to S115. The finalizing section 406 deletes the common setting information from the migration source MFP 100. Further, the finalizing section 406 stores the completion information to the IC card 200a (S115 in FIG. 5B).

The administrator then goes to the migration target MFP 300 and waves his/her IC card 200a over the card reader 316 of the migration target MFP 300. When the waving of the IC card 200a (interface 309) is detected, that is, when the interface 309 of the administrator's IC card 200a faces the card reader 316, the data receiving section 405 authenticates the user of the IC card 200a as an administrator (S116 in FIG. 5B). Then, once it is confirmed that the completion information is present in the administrator's IC card 200a, the data receiving section 405 determines whether or not any user information piece remains in the IC card 200a (S117 in FIG. 5B).

When the determination result indicates that a user information piece (the user information piece B) remains in the administrator's IC card 200a (Yes at S117 in FIG. 5B), the data receiving section 405 reads the user information piece about the user B remaining (stored) in the storage section 403a of the IC card 200a. The data receiving section 405 stores the user information piece B to the second storage section 320 of the migration target MFP 300 (S118 in FIG. 5B). Thus, migration of the user information piece B about the user B is completed.

Furthermore, the data receiving section 405 causes the touch panel 201 to delete the screen inviting user's waving of an IC card. Thus, the data migration is completed.

By contrast, the determination result indicates that no user information piece remains in the administrator's IC card 200a (No at S117 in FIG. 5B), the data receiving section 405 immediately causes the touch panel 201 to delete the screen inviting user's waving of an IC card. Thus, the data migration is completed.

As described so far, in the present disclosure, the migration source MFP 100 includes the data write section 402. Upon detection of user's waving of his/her IC card 200, the data write section 402 authenticates the user of the IC card 200 and stores the user information piece about the user to the IC card 200. The migration target MFP 300 includes the data receiving section 405. Upon detection of user's waving of his/her IC card 200, the data receiving section 405 authenticates the user of the IC card 200 and stores the user information piece stored in the IC card 200 to the second storage section 320. In this manner, the data migration system 1 according to the present disclosure performs migration of the user information on a per user basis through division of the user information on a per user basis. Thus, security can be increased.

In particular, migration of the user information is performed using the IC cards 200 in the present disclosure. Thus, migration of the user information can be done without using any external storage device such as network connection and a USB memory in replacement of migration source MFPs. This is particularly effective in the cases where data migration schemes are strictly limited, for example, where a migration source MFP itself is prohibited from being connected to a network in compliance with the office policy, security regulations, etc. and when any external storage device is disabled. Replacement of image forming apparatuses may occur in purchase of a new image forming apparatus, for example.

While, data analysis of information contained in the IC card 200 may hardly be done through comparison with a USB memory. Accordingly, in view of a security enhancement, the present disclosure is effective in migration of user information as personal information between the migration source MFP 100 and the migration target MFP 300. Since the user information is divided on the basis of per user's IC card 200 for migration, information leakage can be reduced. Even if an IC card 200 of some user is lost, the lost information corresponds to the user information piece about the single user. Accordingly, damage by loss of the user information piece about one user can be less than that by loss of the user information for all users.

Moreover, in the embodiment of the present disclosure, once a user information piece stored in the migration source MFP 100 is stored to the IC card 200, the user information piece stored in the migration source MFP 100 is deleted. However, any other configuration may be employable. For example, data migration may fail in conveyance of an IC card 200 by a user or in data migration from an IC card 200 to the migration target MFP 300. In order to address this situation, for example, the migration source MFP 100 may perform migration of the user information pieces using the IC cards 200 without deleting any user information pieces stored in the migration source MFP 100 and delete all the user information pieces stored in the migration source MFP 100 after receipt of an administrator's instruction to complete the data migration.

Furthermore, in the embodiment of the present disclosure, the common setting information and the user information pieces to be stored in the IC card 200 are not encoded, but one or both of them may be encoded. For example, a common key common to the migration source MFP 100 and the migration target MFP 300 may be prepared in advance, and each user information piece to be written from the migration source MFP 100 to an IC card 200 may be encoded using the common key. In addition, the encoded user information piece to be written from the IC card 200 to the migration target MFP 300 may be decoded using the common key. This can achieve a further security enhancement.

Note that data migration using the IC cards 200 is executed between the migration source MFP 100 and the migration target MFP 300 in the embodiment of the present disclosure, but any other configuration may be employable. For example, the migration source MFP 100 may be any other migration source device that conveys the user information such as a terminal device, a mobile terminal, a tablet terminal, an electronic device, etc., while the migration target MFP 300 may be a migration target device responsive to the migration source device. Alternatively, the migration target MFP 300 may be any other migration target device that conveys the user information such as a terminal device, a mobile terminal, a tablet terminal, an electronic device, etc., while the migration source MFP 100 may be a migration source device responsive to the migration target device. Data migration using the IC cards 200 is executed between any migration source device and any migration target device. No specific limitation is imposed on each device.

A waving of an IC card 200 over the migration source MFP 100 or the migration target MFP 300 causes execution the process series in the present disclosure. However, another configuration may be employable. That is, displaying a screen guiding a user and receiving input of a key pressing corresponding to user's intention each time a process is executed may make progress of the process series.

The data migration system 1 includes the respective elements in the above embodiment. Alternatively, a storage medium storing a program that realizes the respective elements may be provided. With this configuration, the migration source device and the migration target device read out the program to realize the corresponding elements. In this case, the program itself read out from a storage medium provides the operation in the present disclosure. Further, the present disclosure may be provided as a method for causing a hard disk to store the processes that the respective elements execute.

Yet further, the present disclosure can be provided as a computer executable program individually circulating through a telecommunication line or the like. In this case, a central processing unit (CPU) cooperates with respective circuits other than the CPU to realize control operation according to the program in the present disclosure. The respective elements that are realized using the program and the CPU can be constituted using dedicated hardware. The program can be in circulation in the form of a computer readable storage medium storing the program such as a CD-ROM.

In addition, as has been discussed with reference to FIG. 4, both the migration source MFP 100 and the migration target MFP 300 are disabled to perform image formation during the time when the data write section 402 is in the data migration state in the above embodiment. However, the migration source MFP 100 may perform image formation even during the time when the data write section 402 is in the data migration state. Alternatively, the migration target MFP 300 may perform image formation even during the time when the data receiving section 405 is in the data migration state.

As has been discussed so far, the data migration system and method according to the present disclosure are useful for data migration systems including a multifunction peripheral, a copier, a printer, a terminal device, a tablet terminal, a notebook computer, a mobile terminal, etc. The data migration system and method can increase security by migration of user information about each user by dividing the user information on a per user basis, and therefore is useful.

What is claimed is:

1. A data migration system comprising a first image forming apparatus and a second image forming apparatus that are capable of reading and writing data from and to an IC card and that form an image on a sheet, wherein the first image forming apparatus includes:
a first storage section configured to store a plurality of user information pieces, a plurality of identification information pieces, an identification information piece of an administrator, and common setting information, the user information pieces each containing individual setting information inherent in a corresponding one of users that defines a setting for use for the first image forming apparatus, the identification information pieces each corresponding to one of the users, the common setting information indicating setting of the first image forming apparatus common to all of the users;
a data write section configured to store data to an IC card of a user among the users; and
a finalizing section configured to store data to an IC card of the administrator, the second image forming apparatus includes:
a second storage section configured to store a plurality of identification information pieces, the identification information piece of the administrator, and common setting information indicating setting of the second image forming apparatus common to all of the users; and
a data receiving section configured to store a user information piece stored in the IC card of the user to the second storage section, wherein
the user information pieces are personal information registered on a user by user basis and each contain at least one of address information, administration information, document box information, and a fax number that are inherent in a corresponding one of the users,
the data write section has a common setting migration mode, a user migration mode, and an administrator batch migration mode,
the data receiving section has a common setting receiving mode and a data receiving mode,
upon detection of a waving of the IC card of the administrator in the common setting migration mode, the data write section compares the identification information piece of the administrator stored in the first storage section with an identification information piece stored in the IC card of the administrator for authentication of the administrator of the IC card, and upon positive authentication, the data write section stores the common setting information of the first image forming apparatus to the IC card of the administrator, deletes the common setting information of the first image forming apparatus from the first storage section, changes the mode of the data write section from the common setting migration mode to the user migration mode, and starts receiving a waving of the IC card of the user,
upon detection of a waving of the IC card of the administrator in the common setting receiving mode, the data receiving section compares the identification information piece of the administrator stored in the second storage section with an identification information piece stored in the IC card of the administrator for authentication of the administrator of the IC card, and upon positive authentication, the data receiving section replaces the common setting information of the second image forming apparatus with common setting information stored in the IC card of the administrator, changes the mode of the data receiving section from the common setting receiving mode to the data receiving section, and starts receiving a waving of the IC card of the user,
upon detection of a waving of the IC card of the user in the user migration mode, the data write section compares the plurality of identification information pieces stored in the first storage section with an identification information piece stored in the IC card of the user for authentication of the user of the IC card, upon positive authentication, the data write section stores a user information piece for the authenticated user among the plurality of user information pieces stored in the first storage section to the IC card of the user, and each time a user information piece stored in the first storage section is stored to an IC card of a corresponding user, the data write section deletes the user information piece stored to the IC card of the user from the first storage section,
upon detection of a waving of the IC card of the user in the data receiving mode, the data receiving section compares the plurality of identification information pieces stored in the second storage section with an identification information piece stored in the IC card of the user for authentication of the user of the IC card, and stores, upon positive authentication, a user information piece stored in the IC card of the user to the second storage section, in a situation in which any of the user information pieces remains in the first image forming apparatus upon detection of a waving of the IC card of the administrator in the administrator batch migration mode, the finalizing section stores the user information piece remaining in the first image forming apparatus to the IC card of the administrator, and in a situation in which any of the user information pieces remains in the IC card of the administrator upon detection of a waving of the IC card of the administrator in the data receiving mode, the data receiving section stores the user information piece remaining in the IC card of the administrator to the second storage section.

2. A data migration system according to claim 1, wherein the first image forming apparatus further includes a touch panel, and when the user is not authenticated, the data write section causes the touch panel to display a screen indicating that the user is not authenticated.

3. A data migration method for a data migration system including a first image forming apparatus and a second image forming apparatus that are capable of reading and writing data from and to an IC card and that form an image on a sheet, the first image forming apparatus including a first storage section configured to store a plurality of user information pieces, a plurality of identification information pieces, an identification information piece of an administrator, and common setting information, the user information pieces each containing individual setting information inherent in a corresponding one of users that defines a setting for use for the first image forming apparatus, the identification information pieces each corresponding to one of the users, the common setting information indicating setting of the first image forming apparatus common to all of the users, a data write section configured to store data to an IC card of a user, and a finalizing section configured to store data to an IC card of the administrator, the second image forming apparatus including a second storage section that stores a plurality of identification information pieces, the identification information piece of the administrator, and common setting information indicating setting of the second image forming apparatus common to all of the users, and a data receiving section configured to store the user information pieces stored in the IC cards to the second storage section, the user information pieces being personal information registered on a user by user basis and each contain at least one of address information, administration information, document box information, and a fax number that are inherent in a corresponding one of the users, the data write section having a common setting migration mode, a user migration mode, and an administrator batch migration mode, the data receiving section having a common setting receiving mode and a data receiving mode, the data migration method comprising:

upon detection of a waving of the IC card of the administrator in the common setting migration mode, causing the data write section to compare the identification information piece of the administrator stored in the first storage section with an identification information piece stored in the IC card of the administrator for authentication of the administrator of the IC card, and upon positive authentication, causing the data write section to store the common setting information of the first image forming apparatus to the IC card of the administrator, delete the common setting information of the first image forming apparatus from the first storage section, change the mode of the data write section from the common setting migration mode to the user migration mode, and start receiving the waving of the IC card of the user, upon detection of a waving of the IC card of the administrator in the common setting receiving mode, causing the data receiving section to compare the identification information piece of the administrator stored in the second storage section with an identification information piece stored in the IC card of the administrator for authentication of the administrator of the IC card, and upon positive authentication, causing the data receiving section to replace the common setting information of the second image forming apparatus with common setting information stored in the IC card of the administrator, change the mode of the data receiving section from the common setting receiving mode to the data receiving section, and start receiving a waving of the IC card of the user, upon detection of a waving of the IC card of the user in the user migration mode, causing the data write section to compare the plurality of identification information pieces stored in the first storage section with an identification information piece stored in the IC card of the user for authentication of the user of the IC card, upon positive authentication, causing the data write section to store a user information piece for the authenticated user among the plurality of user information pieces stored in the first storage section to the IC card of the user, and each time a user information piece stored in the first storage section is stored to an IC card of a corresponding user, causing the data write section to delete the user information piece stored to the IC card of the user from the first storage section, upon detection of a waving of the IC card of the user in the data receiving mode, the data receiving section to compare the plurality of identification information pieces stored in the second storage section with an identification information piece stored in the IC card of the user for authentication of the user of the IC card, and store, upon positive authentication, a user information piece stored in the IC card of the user to the second storage section, in a situation in which any of the user information pieces remains in the first image forming apparatus upon detection of a waving of the IC card of the administrator in the administrator batch migration mode, causing the finalizing section to store the user information piece remaining in the first image forming apparatus to the IC card of the administrator, and in a situation in which any of the user information pieces remains in the IC card of the administrator upon detection of a waving of the IC card of the administrator in the data receiving mode, causing the data receiving section to store the user information piece remaining in the IC card of the administrator to the second storage section.

4. A data migration system according to claim 1, wherein the first image forming apparatus further includes a finish key for termination of data migration by a user.

5. A data migration system according to claim 1, wherein upon completion of replacement of the common setting information stored in the second image forming apparatus with common seeing information store in the IC card of the administrator in the common setting receiving mode, the data receiving section deletes the common setting information stored in the IC card of the administrator from the IC card of the administrator.

6. A data migration system according to claim 1, wherein upon completion of storage of a user information piece stored in the IC card of the user to the second storage section in the data receiving mode, the data receiving section deletes the user information piece stored in the IC card of the user from the IC card of the user.

7. A data migration system according to claim 1, wherein the first image forming apparatus further includes a data migration start key for causing the data write section to be in the common setting migration mode.

8. A data migration system according to claim 1, wherein the second image forming apparatus further includes a data receiving start key for causing the data receiving section to be in the common setting receiving mode.

9. A data migration system according to claim 1, wherein the first image forming apparatus further includes a touch panel, and
in the user migration mode, the data write section causes the touch panel to display a screen inviting a user to the second image forming apparatus.

10. A data migration method for a data migration system according to claim 3, wherein
the first image forming apparatus further includes a touch panel, and
the method further comprises causing, upon negative authentication of the user, the touch panel of the first image forming apparatus to display a screen indicating that the user is not authenticated.

11. A data migration method for a data migration system according to claim 3, wherein
the first image forming apparatus further includes a finalizing key for termination of data migration by the user.

12. A data migration method for a data migration system according to claim 3, further comprising
upon completion of replacement of the common setting information of the second image forming apparatus with common setting information stored in the IC card of the administrator in the common setting receiving mode, causing the data receiving section to delete the common setting information stored in the IC card of the administrator.

13. A data migration method for a data migration system according to claim 3, further comprising:
upon completion of storage of the user information piece stored in the IC card of the user to the second storage section in the data receiving mode, causing the data receiving section to delete the user information piece stored in the IC card of the user from the IC card of the user.

14. A data migration method for a data migration system according to claim 3, wherein
the first image forming apparatus further includes a data migration start key for causing the data write section to be in the common setting migration mode.

15. A data migration method for a data migration system according to claim 3, wherein
the second image forming apparatus further includes a data receive start key for causing the data receiving section to be in the common setting migration mode.

16. A data migration method for a data migration system according to claim 3, wherein
the first image forming apparatus further includes a touch panel, and
the method further comprises causing the touch panel of the data write section to display a screen for inviting a user to the second image forming apparatus in the user migration mode.

* * * * *